(12) United States Patent  
Landa et al.

(10) Patent No.: US 6,634,478 B2  
(45) Date of Patent: Oct. 21, 2003

(54) RAPID RELEASE CLUTCH PACK

(75) Inventors: David Landa, Pensacola, FL (US); Roy Baker, Atmore, AL (US)

(73) Assignee: Alto Products Corp., Atmore, AL (US)

( * ) Notice: Subject to any disclaimer, the term of this patent is extended or adjusted under 35 U.S.C. 154(b) by 0 days.

(21) Appl. No.: 09/975,210

(22) Filed: Oct. 12, 2001

(65) Prior Publication Data

US 2003/0070896 A1 Apr. 17, 2003

(51) Int. Cl.⁷ .......................... F16D 13/52; F16D 13/69
(52) U.S. Cl. ..................... 192/70.2; 192/70.28
(58) Field of Search .................. 192/70.28, 70.2, 192/70.19, 30 V, 70.17; 188/71.5, 72.3

(56) References Cited

U.S. PATENT DOCUMENTS

| | | | | |
|---|---|---|---|---|
| 2,226,309 A | * | 12/1940 | Gleasman | 192/70.28 |
| 3,249,189 A | * | 5/1966 | Schjolin et al. | 192/70.28 |
| 3,385,408 A | | 5/1968 | Manning | |
| 3,455,423 A | * | 7/1969 | Lindquist | 192/70.28 |
| 3,584,720 A | * | 6/1971 | Bark et al. | 192/70.28 |
| 3,631,953 A | * | 1/1972 | Snoy et al. | 192/70.2 |
| 3,666,062 A | | 5/1972 | Riese | |
| 3,994,378 A | * | 11/1976 | Schwabe et al. | 192/70.28 |
| 4,301,904 A | | 11/1981 | Ahlen | |
| 4,362,227 A | * | 12/1982 | Walton et al. | 192/70.28 |
| 4,548,306 A | | 10/1985 | Hartz | |
| 4,597,479 A | | 7/1986 | Kitano et al. | |
| 4,613,029 A | * | 9/1986 | Beccaris | 192/30 V |
| 4,676,356 A | | 6/1987 | Beccaris et al. | |
| 4,802,564 A | | 2/1989 | Stodt | |
| 4,940,124 A | * | 7/1990 | Galuska et al. | 192/70.28 |
| 5,137,131 A | * | 8/1992 | Enomoto | 192/70.28 |
| 5,386,899 A | * | 2/1995 | Sterling et al. | 192/70.17 |
| 5,647,466 A | | 7/1997 | Umezawa | |
| 5,697,473 A | | 12/1997 | Lindner | |
| 5,779,018 A | | 7/1998 | Hofmann et al. | |
| 6,026,944 A | | 2/2000 | Satou et al. | |
| 6,279,709 B1 | * | 8/2001 | Orlamunder | 192/70.28 |

\* cited by examiner

Primary Examiner—Rodney H. Bonck
(74) Attorney, Agent, or Firm—Stephen E. Feldman

(57) ABSTRACT

The present invention is directed to "wet" friction clutch packs used in land motor vehicle's transmissions. The clutch pack comprises a multitude of friction plates and steel plates, which are stacked one upon the other. The clutch pack further comprises a multitude of splines attached to the outer portions of the steel plates. The steel splines have rubber inserts attached to them. When hydraulic pressure is applied to the clutch pack it is compressed engaging the friction and steel plates and allowing the clutch pack to rotate, however, when the pressure is released the friction plates stay static, whereas the steel plates rotate. The rubber inserts facilitate a rapid release when the clutch pack is disengaged. When pressure is applied to the clutch pack, the rubber inserts do not interfere with the proper operation of the clutch pack.

18 Claims, 3 Drawing Sheets

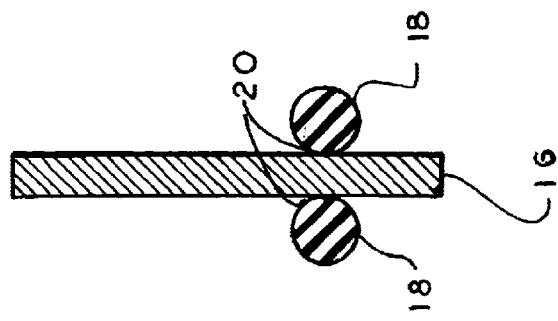
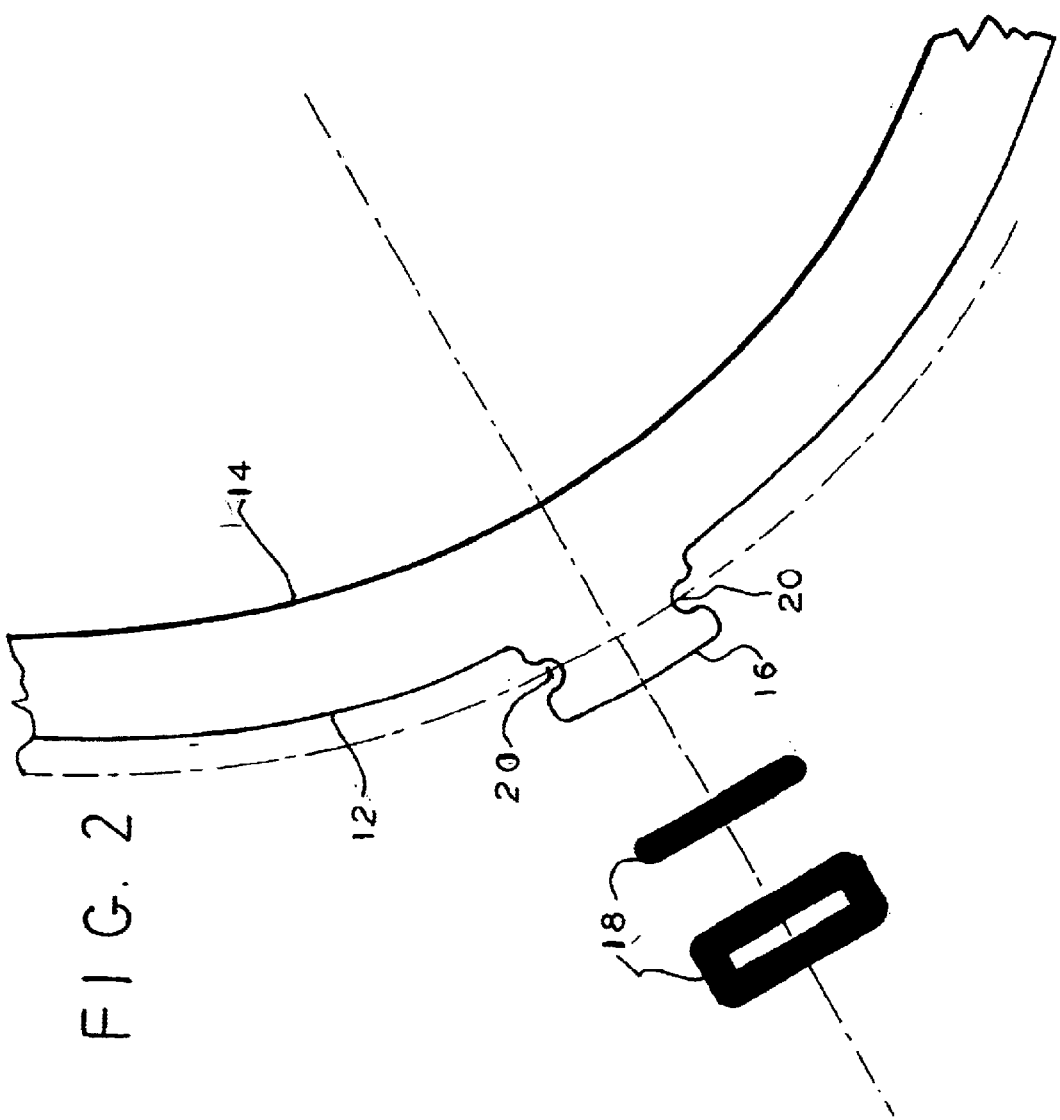

RAPID RELEASE CLUTCH PACK

FIELD OF THE INVENTION

The present invention relates transmissions of a land motor vehicle. In particular, the present invention relates to a field of friction clutch plates. More specifically, the present invention relates to the field of plates in the automatic transmission wet friction clutch pack that are used to transmit a torque from a drive member to a driven member. The present invention accomplishes this by using friction plates and steel plates being in the clutch pack. The steel plate may be splined to the drive member and the friction plate may be splined to the driven member and vice versa. The friction and steel plates are stacked on top of each other; alternatively placing steel and then a friction plate until there is a clutch pack. This arrangement operates using hydraulic fluid and hydraulic principles. When the clutch pack is applied to the steel plates and the friction plates will rotate at the same speed. When the clutch pack is released, the friction plates and the steel plates are not hydraulically linked and steel plates may rotate, while the friction plates are stationary.

BACKGROUND OF THE INVENTION

There are several known for wet friction clutch pack. However, the conventionally known apparatuses lack the purpose that the present invention so readily provides. Furthermore, the prior art does not achieve the same results as the present invention does. The following is a discussion of such prior art and the reasons for the lack of complacency with the parameters that the present invention has.

U.S. Pat. No. 4,301,904 to Ahlen teaches a multiple disc clutch. This prior art is particularly suitable for use in a driveline between an engine and a synchromesh gear in vehicular transmission. A multiple disc clutch in accordance with this particular prior art may be termed as "half-wet" clutch. This prior art comprises a multiple clutch disc having first and a second sets of interleaved and axially moveable clutch discs, restraining means for restraining at least the axial movement of each disc of the first set of discs, the restraining means comprising a number of first and second sets of stop members serving to limit the axial position of the first set of discs, when in disengaged position, in one axial direction and the second stop members serving to limit the axial position of the first set of discs, when in the disengaged position, in the opposite axial direction, thereby defining spaces for each second disc between two succeeding first discs, and means for axially displacing the discs of the first set to establish engagement thereof with the second set of discs. The present invention is used in automatic transmission of a land motor vehicle. The present invention comprises friction and steel plates being stacked upon each other, this is performed repeatedly until there is a formation of a clutch pack. A proper operation of the present invention is dependent on the presence of a hydraulic fluid or an application of methods involving hydraulic principles. The present invention operates at compression-release sequence, wherein when the clutch pack is released the friction plates and the steel plates are not hydraulically linked and steel plates may rotate, while the friction plates are stationary. An important feature of the present invention facilitates a rapid release of the plates, when the clutch pack is disengaged. This feature comprises rubber inserts that are 0.004" thicker than the mating friction plates. These rubber inserts are installed onto the steel splines. The rubber inserts push the steel plates away from the friction plates when hydraulic pressure is released from the clutch pack. Furthermore, when the hydraulic pressure is applied to the clutch pack, rubber inserts compress and do not interfere with a normal operation of the clutch pack.

U.S. Pat. No. 4,548,306 to Hartz teaches a plate separator. This particular prior art is a plate separator for a multi-plate clutch. It includes a circular spine and integral bifurcations extending in opposite directions from the spine. The plate separator is disposed in an annulus defined by a pair of outer friction plates and an interposed inner friction plate. When the outer friction plates clamp the inner friction plate, the bifurcations flex at their junctures with the spine. When the inner friction plate is released, the bifurcations un-flex to separate the outer plates from the inner plate. The present invention differs from this prior art in structure and its function. The present invention is a clutch pack comprising a multitude of friction and steel plates operating under hydraulic principles or with an assistance of a hydraulic fluid. When the clutch pack is applied, the steel plates and the friction plats rotate at the same speed. However, when the clutch pack is released the friction plates and the steel plates are not hydraulically linked and steel plates may rotate, while the friction plates are stationary. The present invention further comprises rubber inserts that are 0.004" thicker than the mating plates and these rubber inserts are installed onto the steel splines. The rubber inserts push away the steel plates from the friction plates when the hydraulic pressure is released from the clutch pack. When the hydraulic pressure is applied to the clutch pack, rubber inserts compress and do not interfere with the operation of the clutch pack.

The discussed prior art presents a formidable database of information. However, this prior art does not attempt to solve the problems that the present invention is designed to answer. The present invention is a unique variation.

It should be clear to one skilled in the art, that the above discussed prior art is used for the purposes of illustration and should not be construed as limiting in any way, except for the prior art elements claimed in the above patents.

SUMMARY OF THE INVENTION

The object of the present invention is to provide for a friction clutch pack.

Another object of the present invention is to provide for a friction clutch pack comprising steel plates and friction plates being stacked upon each other.

Another object of the present invention is to provide for a friction clutch pack that operates using hydraulic fluid or any other hydraulic principles.

Another object of the present invention is to provide for a friction clutch pack that when applied its steel plates and friction plates rotate at the same speed.

Another object of the present invention is to provide for a friction clutch pack that when released its steel plates rotate while its friction plates remain stationary.

Another object of the present invention is to provide for a friction clutch pack that comprise rubber inserts placed on the clutch pack's steel splines.

Another object of the present invention is to provide for a friction clutch pack that comprises rubber inserts that are 0.004" thicker than the mating friction plates.

Other objects of the present invention will become apparent to one skilled in the art from the following description of the present invention's elements. It should, however, be noted that the present invention is not limited to the embodi-

BRIEF DESCRIPTION OF THE DRAWINGS

The following description of preferred embodiment of the present invention will be better understood when read in conjunction with the appended drawings. It should be understood, however, that the invention is not limited to the precise arrangements shown in which:

FIG. 2 is a plain view of a portion of a present invention showing side and top view of the rubber inserts and a place of installation of the rubber inserts.

FIG. 4 is a plain view of the present invention showing a detailed portion of the present invention's section of where the rubber inserts are applied.

DESCRIPTION OF THE PREFERRED EMBODIMENT

In the following description, references to the drawings, certain terms are used for conciseness, clarity and comprehension. It is assumed by one skilled in the art that there are to be no unnecessary limitations implied from the references, besides the limitations imposed by the prior art, because such terms and references are used for descriptive purposes only and intended to be broadly construed. Furthermore, the description and the drawings are for illustrative purposes only and not to be construed as limited to the exact details shown, depicted, represented, or described.

The present invention is directed to a friction clutch pack, or a "wet" friction clutch pack used in land motor vehicle automatic transmission. More specifically, the present invention is directed to friction clutch pack that operates under hydraulic principles or with an application of a hydraulic fluid. The present invention further is directed to a friction clutch pack having steel and friction plates stacked on each other. Furthermore, the present invention is further directed to a friction clutch pack having rubber inserts, that facilitate the release of the clutch pack when the clutch pack is disengaged. The rubber inserts push the steel plates away from the friction plates when the hydraulic pressure is released from the clutch pack. When, on the other hand, the hydraulic pressure is applied to the clutch pack, then the rubber inserts compress without any interference with the clutch pack's operation.

Figure 1:
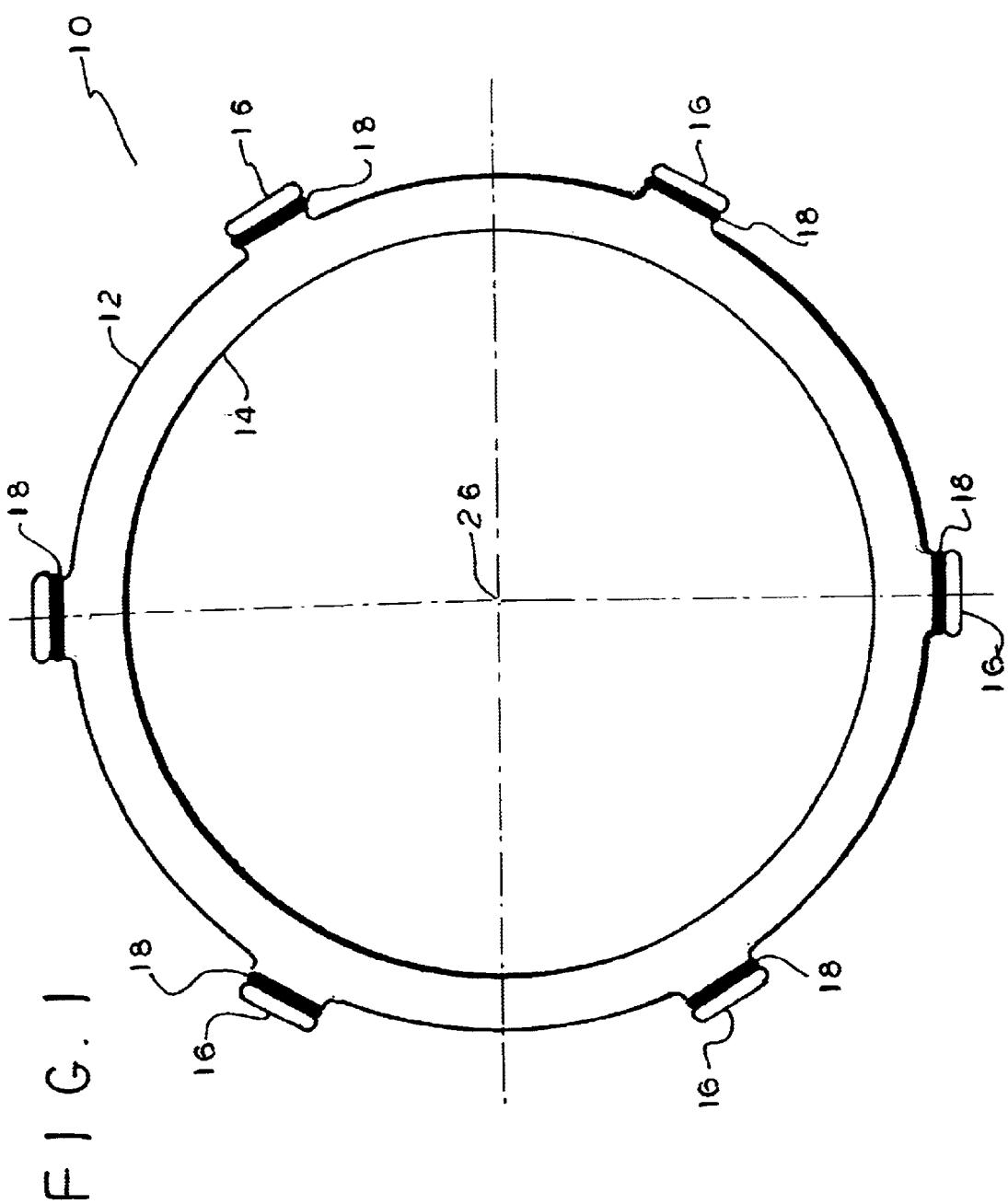
FIG. 1 is a plain view of the present invention with rubber inserts installed on the steel splines and holding down the clutch pack.

Referring to FIGS. 1 through 4, the friction clutch plate 10 is shown to have a multitude of steel splines 16. In the embodiment shown in FIG. 1, the friction clutch plate has six steel splines 16. The friction clutch plate 10 is in a circular shape, as shown in the FIG. 1 embodiment, with a center of said clutch plate 10 at point 26. The round shape of the friction plate 10 facilitates its rotation when the friction and the steel plates are stacked upon each other the clutch pack 50, as shown in FIGS. 3a and 3b, is applied. Referring to FIG. 1, the friction plate 10 has steel splines 16 extending outwardly from the center 26 and are located on the outer surface 12 of the friction plate. The inner surface 14 of the friction plate 10, as shown in FIG. 1, comes in contact with main elements of an automatic transmission of the land motor vehicle. The friction plate 10 further comprises rubber inserts 18 placed on the steel splines 16. The rubber inserts 18 are placed on the outer surface of the steel splines 16.

Figure 3A:
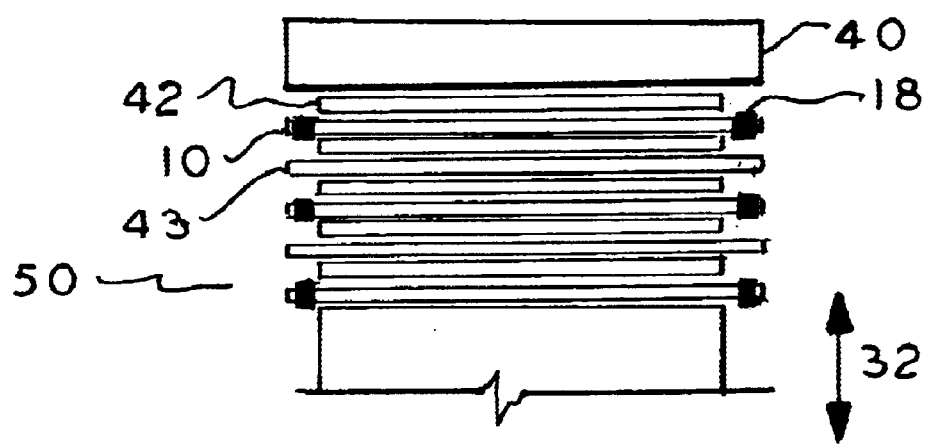
FIG. 3a is side view of the present invention showing the position of the clutch pack when the clutch pack is released.
Figure 3B:
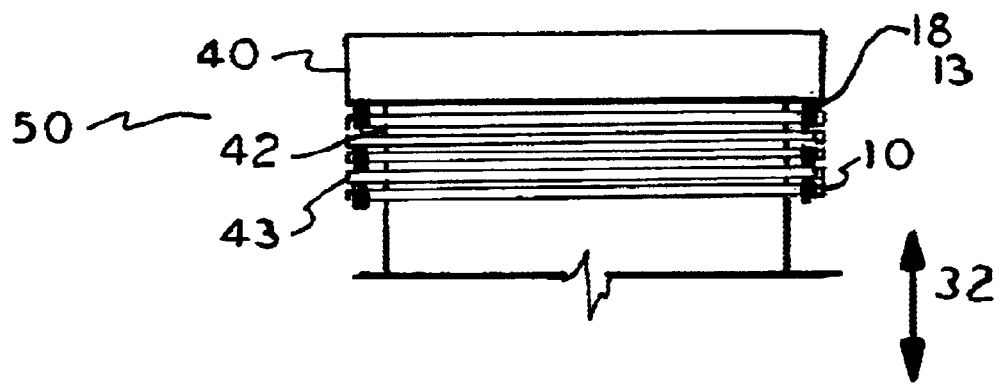
FIG. 3b is a side view of the present invention showing the position of the clutch pack when the hydraulic pressure is applied to the clutch pack.

The function of the rubber inserts 18 is to facilitate a rapid release of the clutch pack 50, as shown in FIG. 3a, is disengaged. The rubber inserts 18 are push the steel plates 42 and 43 away from the friction plates, when the hydraulic pressure 32 is released (as shown in FIG. 3a, in a downward direction 32). Referring to FIG. 3b, when the hydraulic pressure 32 is engaged (FIG. 3b, upward direction 32), pushing the rubber inserts 18 closer to the pressure plate 40, the rubber inserts 18 compress and, thus, do not interfere with a normal operation of the friction clutch pack 50.

Referring to FIG. 2, a portion of the friction plate 10 is shown. The splines 16 are shown to have grooved portions 20, which serve to accommodate rubber inserts 18, when the latter ones are placed on top of the steel splines 16. The rubber inserts 18 are shown on FIG. 2 from the side view and the tope view. In one embodiment, the rubber inserts 18 are 0.004" thicker than the mating friction plates, this allows for a rapid release of plates when the clutch pack 50 is disengaged, as shown in FIG. 3a. The grooved portions 20 are so designed that they are capable of holding the rubber inserts 18, so that the latter one do not interfere with the operation of the clutch pack 50 when it is disengaged or engaged, as shown in FIGS. 3a and 3b, respectively.

Referring to FIG. 4, the present invention's embodiment is shown from the side, in particular, a side view of the present invention is shown. A cross-section of the steel spline 16 is shown to be encompassed by the cross-sections of the rubber inserts 18. The cross-sections of the rubber inserts 18 are attached to the cross-section of the steel spline 16 at the cross-section of the grooved portions 20 of the steel spline 16.

The clutch pack 50 comprises of several friction and steel plates which are stacked upon each other and forming said clutch pack. The operation of the clutch pack 50 depends on the application of the hydraulic fluid or some other hydraulic principles. The friction plates and the steel plates are not hydraulically linked, thus, when the clutch pack is released the friction plates and the steel plates are not rotating together, in fact the steel plates may continue to rotate but the friction plates are static.

In the foregoing description of the invention, reference to the drawings, certain terms, have been used for clarity, conciseness and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented, or described.

While the present invention has been described with reference to specific embodiments, it is understood that the invention is not limited but rather includes any and all changes and modifications thereto which would be apparent to those skilled in the art and which come within the spirit and scope of the appended claims.

What is claimed:

1. A friction clutch pack comprising
   a. a friction plate;
   b. a steel plate;

c. wherein said friction plate and said steel plate are stacked adjacently;
d. said friction plate further comprising
   i. a plurality of steel splines, wherein said steel splines extend outwardly away from a surface of said steel plate;
   ii. a plurality of rubber inserts, for rapid release of said friction plate, where one insert encircles the outside edge of one corresponding spline.

2. The friction clutch pack of claim 1, wherein said steel splines further comprising grooved sections, wherein said grooved sections serve to receive said engaging means.

3. The friction clutch pack of claim 2, wherein said grooved sections are machined in said steel splines.

4. The friction clutch pack of claim 1, wherein said rubber inserts are 0.004 inches thicker than said friction plate.

5. The friction clutch pack of claim 1, wherein said clutch pack may be engaged, whereby a hydraulic pressure is applied to said friction clutch pack, and may be disengaged, whereby a hydraulic pressure is not applied to said friction clutch pack.

6. The friction clutch pack of claim 5, wherein said rubber inserts facilitate a rapid release of said clutch pack when said friction clutch pack is disengaged.

7. The friction clutch pack of claim 5, wherein said rubber inserts compress when said friction clutch plate is engaged.

8. The friction clutch plate of claim 5, wherein said rubber inserts serve to push said steel plate away from said friction plate when said friction clutch pack is engaged.

9. The friction clutch pack of claim 1, wherein said clutch pack further comprises more than one said friction plate.

10. The friction clutch pack of claim 1, wherein said clutch pack further comprises more than one said steel plate.

11. A friction clutch pack comprising:
   a. a friction plate;
   b. a steel plate;
   c. wherein said friction plate and said steel plate are stacked adjacently;
   d. said friction plate further comprising:
      i. a plurality of steel splines, wherein said steel splines extend outwardly away from a surface of said steel plate;
      ii. a plurality of rubber inserts, for rapid release of said friction plate, where one insert encircles the outside edge of one corresponding spline; and
      iii. wherein said steel splines further comprising grooves, wherein said groves serve to receive said rubber inserts, wherein said grooves are machined in said steel splines.

12. The friction clutch pack of claim 11, wherein said rubber inserts are 0.004 inches thicker than said friction plate.

13. The friction pack of claim 11, wherein said clutch pack may be engaged, whereby a hydraulic pressure is applied to said friction clutch pack, and may disengaged, whereby a hydraulic pressure is no applied to said friction clutch pack.

14. The friction clutch pack of claim 13, wherein said rubber inserts facilitate a rapid release of said clutch pack when said friction clutch pack is disengaged.

15. The friction clutch pack of claim 13, wherein said rubber inserts compress when said friction clutch plate is engaged.

16. The friction clutch pack of claim 13 wherein said rubber inserts serve to push said steel plate away from said friction plate when said friction clutch pack is engaged.

17. The friction clutch pack of claim 11, wherein said clutch pack further comprises more than one said friction plate.

18. The friction clutch pack of claim 11, wherein said clutch pack further comprises more than one said steel plate.

* * * * *